(12) United States Patent
Samp

(10) Patent No.: US 10,193,413 B2
(45) Date of Patent: Jan. 29, 2019

(54) MOUNTING BRACKET FOR WATER COOLED TYPE ALTERNATOR

(71) Applicant: Bosch Automotive Service Solutions Inc., Warren, MI (US)

(72) Inventor: Chad Samp, Albert Lea, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 487 days.

(21) Appl. No.: 14/969,603

(22) Filed: Dec. 15, 2015

(65) Prior Publication Data

US 2017/0170700 A1 Jun. 15, 2017

(51) Int. Cl.
*H02K 5/00* (2006.01)
*H02K 5/26* (2006.01)
*H02K 5/04* (2006.01)
*H02K 5/24* (2006.01)

(52) U.S. Cl.
CPC .................. *H02K 5/26* (2013.01); *H02K 5/00* (2013.01); *H02K 5/04* (2013.01); *H02K 5/24* (2013.01)

(58) Field of Classification Search
CPC ............... H02K 5/04; H02K 5/00; H02K 5/24
USPC ............. 310/89, 91; 474/112, 114, 115, 133; 248/656, 666
See application file for complete search history.

(56) References Cited

U.S. PATENT DOCUMENTS

| | | | |
|---|---|---|---|
| 1,313,061 A | 8/1919 | Brown | |
| 2,578,694 A | 12/1951 | Goldman | |
| 3,745,456 A | 7/1973 | Kahler | |
| 3,893,029 A | 7/1975 | Vensel et al. | |
| 3,903,737 A | 9/1975 | Burden et al. | |
| 3,936,744 A | 2/1976 | Perlmutter | |
| 4,070,624 A | 1/1978 | Taylor et al. | |
| 4,329,608 A * | 5/1982 | Hagenlocher | H02K 5/26 310/91 |
| 4,471,251 A * | 9/1984 | Yamashita | B60J 5/0405 296/146.2 |
| 4,500,304 A | 2/1985 | Foster | |
| 4,641,534 A | 2/1987 | Schneider et al. | |
| 4,666,122 A | 5/1987 | Goodard | |
| 4,781,665 A | 11/1988 | Walker | |
| 4,789,127 A * | 12/1988 | Gleason, Jr. | F16M 7/00 248/500 |
| 4,832,666 A | 5/1989 | Henderson | |
| 4,849,665 A | 7/1989 | Kitamura et al. | |
| 4,867,427 A | 9/1989 | Cunningham | |
| 4,945,272 A | 7/1990 | Ochi et al. | |
| 4,980,589 A | 12/1990 | Ochi et al. | |
| 5,040,493 A | 8/1991 | Gajewski et al. | |
| 5,125,376 A | 6/1992 | Williams et al. | |
| 5,156,573 A | 10/1992 | Bytzek et al. | |
| 5,195,366 A | 3/1993 | Duncan | |
| 5,214,448 A * | 5/1993 | Venthem | G01D 15/24 310/91 |
| 5,473,208 A | 12/1995 | Stihi | |
| 5,541,840 A | 7/1996 | Gurne et al. | |

(Continued)

*Primary Examiner* — Hanh Nguyen
(74) *Attorney, Agent, or Firm* — Baker & Hostetler LLP

(57) ABSTRACT

A mounting bracket for a water cooled type alternator is provided. The mounting bracket includes a body, a plurality of bolts attached to the body, a plurality of pivot arms including a first pivot arm attached to a first bolt in the plurality of bolts at first end of the first pivot arm, and a link arm coupled to the body at a second bolt in the plurality of bolts.

20 Claims, 9 Drawing Sheets

(56) References Cited

U.S. PATENT DOCUMENTS

| | | |
|---|---|---|
| 5,550,485 A | 8/1996 | Falk |
| 5,568,916 A | 10/1996 | Gibbons et al. |
| 5,689,517 A | 11/1997 | Ruparel |
| 5,701,089 A | 12/1997 | Perkins |
| 5,705,870 A | 1/1998 | Thomsen et al. |
| 5,714,813 A * | 2/1998 | Yamashita ............ H02K 37/24 310/49.55 |
| 5,718,196 A | 2/1998 | Uchiyama et al. |
| 5,816,568 A | 10/1998 | Fox |
| 5,938,169 A | 8/1999 | Ogawa et al. |
| 6,009,363 A | 12/1999 | Beckert et al. |
| 6,026,461 A | 2/2000 | Baxter et al. |
| 6,147,426 A | 11/2000 | Lepi et al. |
| 6,175,789 B1 | 1/2001 | Beckert et al. |
| 6,181,992 B1 | 1/2001 | Gurne et al. |
| 6,226,305 B1 | 5/2001 | McLoughlin et al. |
| 6,276,194 B1 | 8/2001 | Vinton et al. |
| 6,292,931 B1 | 9/2001 | Dupenloup |
| 6,304,012 B1 | 10/2001 | Chen et al. |
| 6,304,016 B1 | 10/2001 | Frederick et al. |
| 6,394,250 B1 | 5/2002 | Ouchi |
| 6,466,025 B1 | 10/2002 | Klang |
| 6,480,723 B1 | 11/2002 | Davidson et al. |
| 6,553,039 B1 | 4/2003 | Huber et al. |
| 6,634,896 B1 | 10/2003 | Potega |
| 6,638,191 B1 * | 10/2003 | Hankins .................... F16H 7/14 474/101 |
| 6,647,027 B1 | 11/2003 | Gasparik et al. |
| 6,674,046 B2 | 1/2004 | Gitter et al. |
| 6,687,263 B2 | 2/2004 | Oldenborgh et al. |
| 6,704,829 B1 | 3/2004 | Hoshi et al. |
| 6,705,581 B2 * | 3/2004 | Trago ...................... F16H 7/14 248/656 |
| 6,738,696 B2 | 5/2004 | Oi |
| 6,777,945 B2 | 8/2004 | Roberts et al. |
| 6,791,332 B2 | 9/2004 | Raichle |
| 6,803,748 B2 | 10/2004 | Peter |
| 6,834,631 B1 | 12/2004 | Blackburn et al. |
| 6,895,809 B2 | 5/2005 | Raichle |
| 6,986,292 B2 | 1/2006 | Kemnade |
| 7,134,325 B2 | 11/2006 | Krampitz et al. |
| 7,150,186 B2 | 12/2006 | Murphy et al. |
| 7,152,464 B2 | 12/2006 | Krampitz et al. |
| 7,212,911 B2 | 5/2007 | Raichle et al. |
| 7,246,015 B2 | 7/2007 | Bertness et al. |
| 7,472,820 B2 | 1/2009 | Krampitz et al. |
| 7,640,795 B2 | 1/2010 | Raichle |
| 7,690,573 B2 | 4/2010 | Raichle et al. |
| 7,696,759 B2 | 4/2010 | Raichle et al. |
| 2004/0163501 A1 | 8/2004 | Chen |
| 2006/0119365 A1 | 6/2006 | Makhija |

* cited by examiner

MOUNTING BRACKET FOR WATER COOLED TYPE ALTERNATOR

FIELD OF THE DISCLOSURE

The present disclosure generally pertains to the field of testing devices for alternators. More particularly, the present disclosure relates to a mounting bracket for a water cooled type alternator and a method for providing the same.

BACKGROUND OF THE DISCLOSURE

A water cooled type alternator is a type of an alternator that is mounted within an engine block of a vehicle. A water jacket of the engine block is designed to support the water cooled type alternator. This arrangement is different from a conventional alternator, which is typically mounted on pins and/or bolts. Such pins and/or bolts for the conventional alternator are provided on a conventional tester for testing the conventional alternator. However, a conventional tester has fixed pin arrangements. An alternator, such as the water cooled type alternator, having pin arrangements different from those provided on the conventional tester, may not be mountable on the conventional tester. Further, for the water cooled type alternator, conventional testers provide a fixed single mounting pin to mount the water cooled type alternator, and such a single mounting pin bears all the weight of the water cooled type alternator causing bending and potential breakage of the single mounting pin, as well as potential damage to the alternator casing.

Accordingly, there is a need for properly mounting a water cooled type alternator on a conventional tester to bench test the water cooled type alternator.

SUMMARY OF THE DISCLOSURE

The foregoing needs are met, to a great extent, by the present disclosure, wherein in one aspect, a mounting bracket for a water cooled type alternator and a method for providing the same are provided.

In accordance with one aspect of the present disclosure, a mounting bracket for a water cooled type alternator is provided. The mounting bracket includes a body, a plurality of bolts attached to the body, a plurality of pivot arms including a first pivot arm attached to a first bolt in the plurality of bolts at first end of the first pivot arm, and a link arm coupled to the body at a second bolt in the plurality of bolts.

In accordance with another aspect of the present disclosure, a system for mounting a water cooled type alternator is provided. The system includes a tester including a chassis, and a mounting bracket attached to the chassis via a link arm. The mounting bracket includes a body, a plurality of bolts attached to the body of the mounting bracket, a pivot arm, at least one bolt in the plurality of bolts attached to a first end of the pivot arm, and a mounting pin coupled to a second end of the pivot arm.

In accordance with yet another aspect of this disclosure, a method for providing a mounting bracket for a water cooled type alternator is provided. The method includes providing a body of a mounting bracket, providing a plurality of bolts attached to the body, a first bolt in the plurality of bolts attached to a first pivot arm at a first end of the first pivot arm and a second bolt in the plurality of bolts attached to a second pivot arm at a first end of the second pivot arm, and providing at least two mounting pins. A first mounting pin is coupled to a second end of the first pivot arm and a second mounting pin is coupled to a second end of the second pivot arm coupled to the second bolt for mounting a water cooled type alternator. The first mounting pin and the second mounting pin are movable to respective positions to match a mounting hole pattern of the water cooled type alternator.

There has thus been outlined, rather broadly, certain aspects of the disclosure in order that the detailed description herein may be better understood, and in order that the present contribution to the art may be better appreciated. There are, of course, additional aspects of the present disclosure that will be described below and which will form the subject matter of the claims appended hereto.

In this respect, before explaining at least one aspect of the present disclosure in detail, it is to be understood that the present disclosure is not limited in its application to the details of construction and to the arrangements of the components set forth in the following description or illustrated in the drawings. The present disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

DETAILED DESCRIPTION

Figure 1:
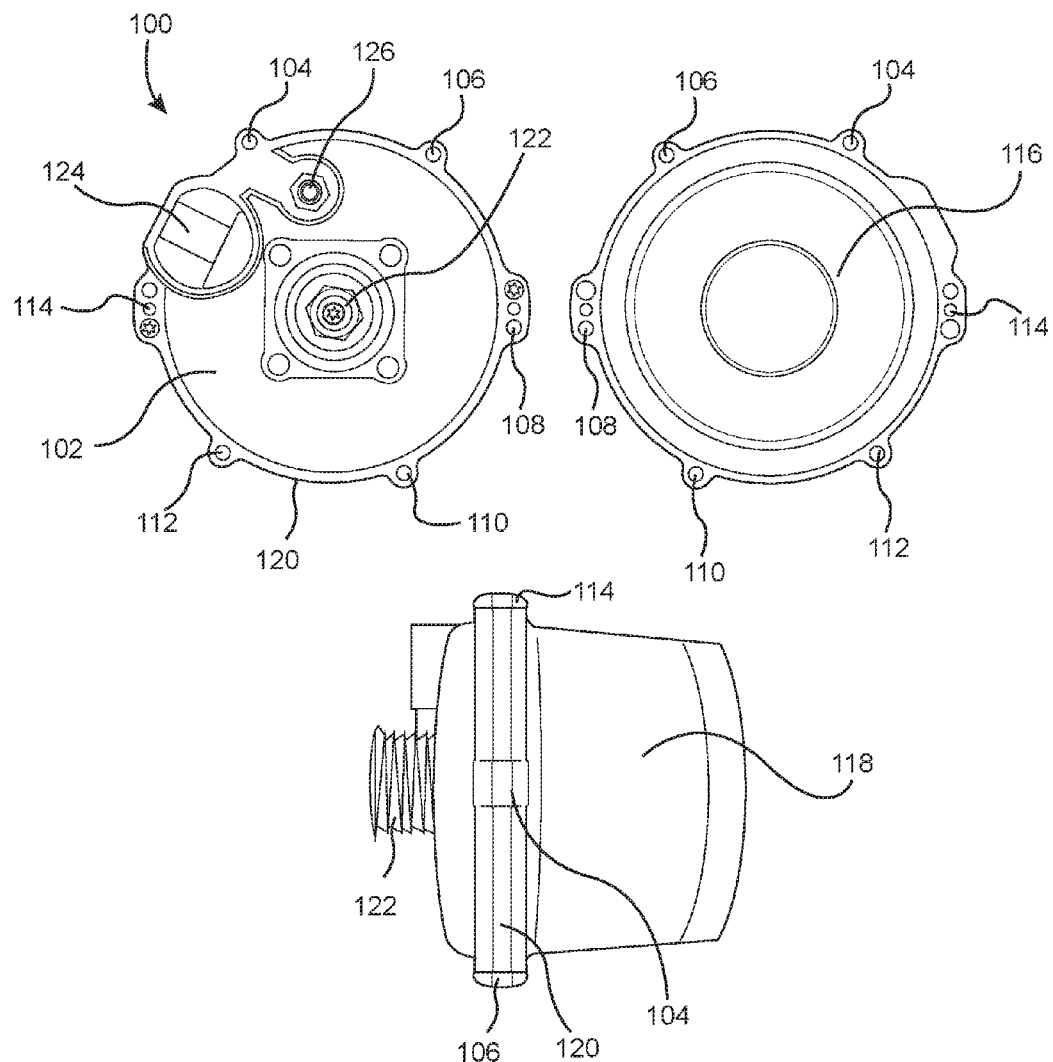
FIG. 1 illustrates clockwise bottom, top, and side views of a water cooled type alternator.

The present disclosure will now be described with reference to the drawing figures, in which like reference numerals refer to like parts throughout. An aspect in accordance with the present disclosure provides a mounting bracket for water cooled type alternators that overcome the drawbacks of the conventional approach for mounting water cooled type alternators to a tester for bench testing.

Referring to FIG. 1, there is illustrated, in a clockwise direction, a bottom view, a top view, and a side view of a water cooled type alternator 100. The water cooled type alternator 100 includes a bottom part 102, a top part 116, and a side part 118. Inside a vehicle, a water jacket of an engine block surrounds the top part 116 and the side part 118 and keeps the water cooled type alternator 100 operating in a recommended temperature range. The bottom part 102 includes an input shaft 122 that is exposed and when inside the engine block receives an input from an engine of the vehicle to keep the water-cooled type alternator 100 running. The bottom part 102 further includes a communication port 124 and an electrical input 126.

The side part 118 includes a mounting hole pattern on a side rim 120 formed by mounting holes 104, 106, 108, 110, 112, and 114, by way of example only and not by way of limitation. For example, a higher or a lower number of mounting holes may be provided on the water cooled type alternator 100 depending upon a specific make and type of the water cooled type alternator 100.

Figure 2:
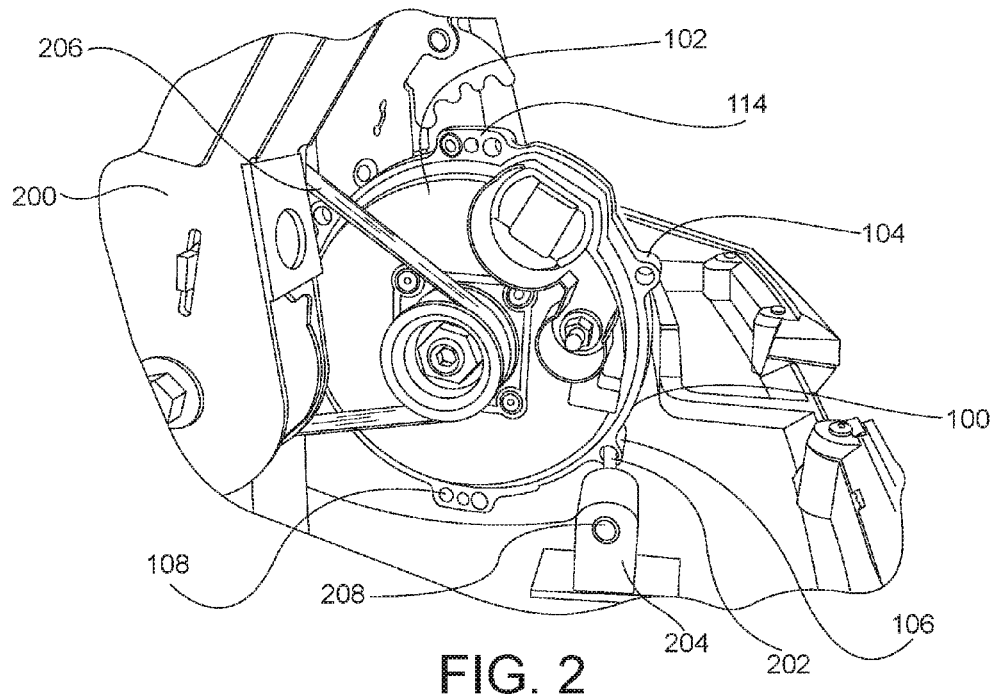
FIG. 2 illustrates a front view of the water cooled type alternator mounted on a tester using a single mounting pin.
Figure 3:
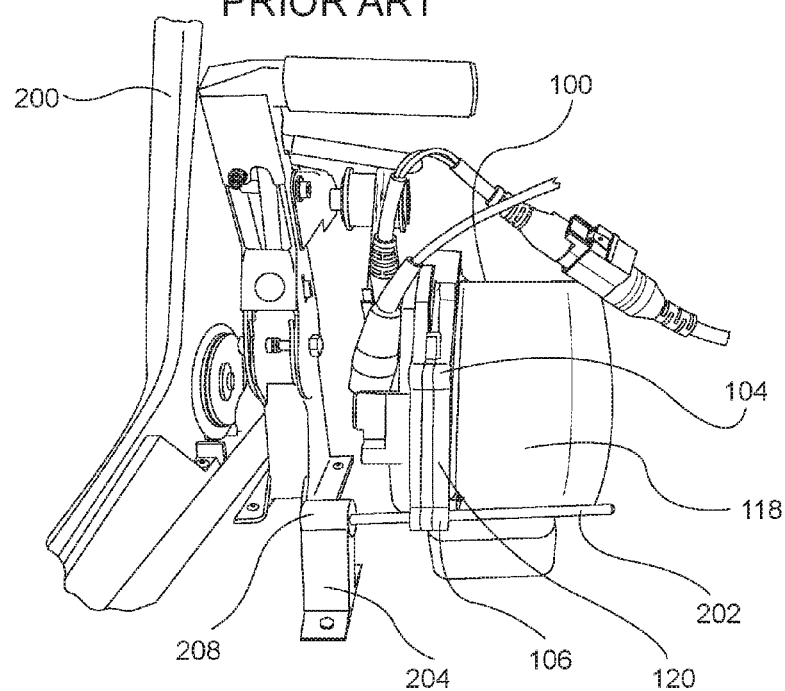
FIG. 3 illustrates a side view of the water cooled type alternator mounted on the tester using the single mounting pin.

Referring to FIGS. 2 and 3, front and side views, respectively, of a single mounting pin 202 attached to a fixed base 204 of the tester 200 are illustrated. The single mounting pin 202 is inserted into one of the mounting holes 104, 106, 108, 110, 112, or 114 (e.g., into the mounting hole 106 in the example shown in FIGS. 2 and 3) to conventionally mount the water cooled type alternator 100 into a tester 200. An end of the single mounting pin 202 attaches to a fixed point 208 of the fixed base 204 of the tester 200. For example, the single mounting pin 202 may be press fitted or welded to the fixed point 208. As more clearly understood using the side view in FIG. 3, the single mounting 202 in the tester 200 bears all the weight of the water cooled type alternator 100, and eventually bends and/or breaks over time. Further, since the fixed base 204 has a fixed position in the tester 200, different mounting hole patterns (not shown in FIGS. 1-3) for a different make and type of the water cooled type alternator 100 may not be accommodated by the tester 200. In such cases, multiple testers, similar to the tester 200, have to be utilized with each one of such multiple testers being designed for only one type of the water cooled type alternator 100. Furthermore, the single mounting pin 202 increases the chances of damage to a case in which the alternator 100 and to the mounting holes 104, 106, 108, 110, 112, or 114 of the alternator 100. For example, supporting the alternator 100 with only one mounting hole (or flange) amongst the mounting holes 104, 106, 108, 110, 112, or 114 could damage the alternator 100's case and/or a seal of the alternator 100. This may lead to increased costs and inflexibility in bench testing of water cooled type alternator 100.

Figure 4A:
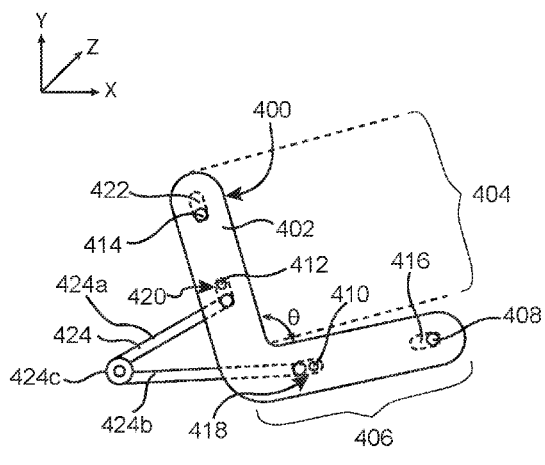
FIGS. 4A and 4B illustrate side views of a mounting bracket for the water cooled type alternator, according to an exemplary aspect of the present disclosure.

Referring to FIG. 4A, there is illustrated a mounting bracket 400, in accordance with an aspect of this disclosure. In the view shown in FIG. 4A, the mounting bracket 400 is viewed perpendicular to an XY plane of a Cartesian coordinate system illustrated by the XYZ-axes. The mounting bracket 400 includes a body 402. The body 402 may include a first portion 404 and a second portion 406. In one aspect, the first portion 404 is substantially perpendicular to the second portion 406. The term "substantially perpendicular" may include values of an angle θ being exactly equal to 90°, approximately equal to 90°, or anywhere between 85° to 95°. Alternatively, in another aspect, the first portion 404 and the second portion 406 may not be substantially perpendicular, in which case, the values of the angle θ may be outside the range of values associated with the angle θ when the first portion 404 and the second portion 406 are substantially perpendicular in relative orientation. For example, the body 402 may be in a shape of the English language letter "L." A length of each of the first portion 404 and the second portion 406 may be variable. For example, the first portion 404 and the second portion 406 may be equal in size and length, or may be unequal. Further, the first portion 404 and the second portion 406 may be formed from a single integrated metallic, composite, or other hard material forming the body 402 of the mounting bracket 400.

Figure 5A:
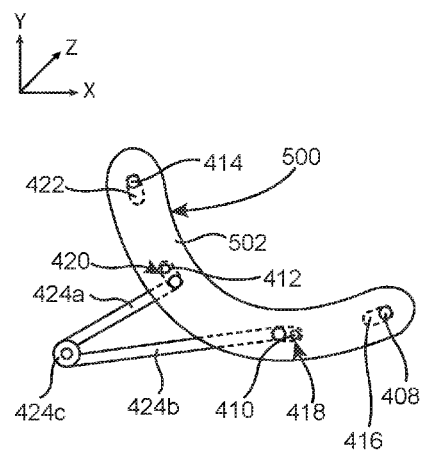
FIGS. 5A and 5B illustrate side views of a mounting bracket for the water cooled type alternator, according to another exemplary aspect of the present disclosure.

Referring to FIG. 5A, there is illustrated the mounting bracket 500, in accordance with another aspect of this disclosure. In the view shown in FIG. 5A, the mounting bracket 500 is viewed perpendicular to an XY plane of a Cartesian coordinate system illustrated by the XYZ-axes. The mounting bracket 500 in FIG. 5A includes a body 502 that is different in shape from the body 402 in FIG. 4A. As illustrated, the body 502 is arcuate in shape. The term "arcuate" may relate to a shape that is a part of an arc of a circle. Such an arcuate shape may resemble the letter "C" of the English language, although other arcuate shapes of the body 502, including but not limited to, a portion of a semi-circle, a portion of an ellipse, or a geometric curve other than a semi-circle or an ellipse, such as a portion of a hyperbola, may be used. It will be appreciated by one of ordinary skill in the art in view of this disclosure that the discussion herein with respect to the body 402 of the mounting bracket 400 is equally applicable to the body 502 of the mounting bracket 500.

By way of example only and not by way of limitation, the mounting brackets 400 and/or 500 may have a bracket length or an arcuate length of 4-6 inches, a thickness of ¼ to ⅜ inches, and a height of 3-4 inches measured from a lowest point to a highest point of the mounting bracket 400 or the mounting bracket 500.

Figure 4B:
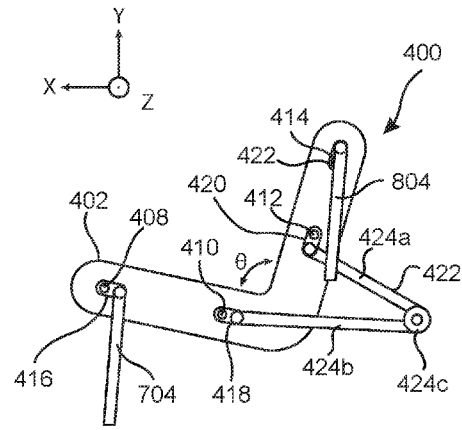
Figure 5B:
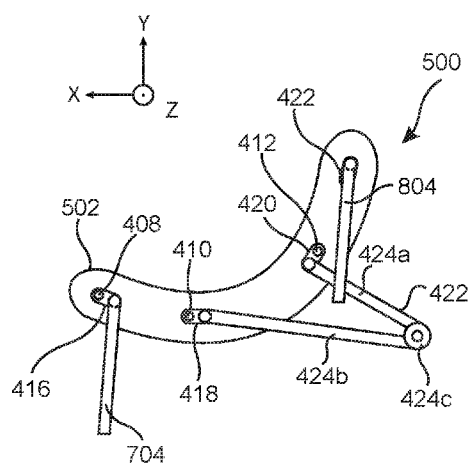

FIGS. 4B and 5B illustrate another view of the mounting brackets 400 and 500, respectively along a direction anti-parallel to the Z-axis. In the view shown in FIGS. 4B and 5B, a mounting pin 704 is coupled to the pivot arm 416 and a mounting pin 804 is coupled to the pivot arm 422. A link arm 424 is coupled at the pivot arms 420 and 418, although the link arm 424 may be coupled at other points to the mounting brackets 400 and 500. For example, the link arm 424 may be welded to the body 402 and/or the body 502.

Referring again to FIGS. 4A, 4B and 5A, 5B, in one aspect, the mounting bracket 400 and/or the bracket 500 is coupled to the link arm 424 at the bolt 412. The link arm 424 includes a first member 424a and a second member 424b conjoined at a common point 424c. The link arm 424 may attach the mounting bracket 400 to a chassis 902 (shown in FIG. 9, for example) of the tester 200, e.g., via a base 1104 (shown in FIG. 11). In one aspect, the link arm 424 may be attached to the mounting bracket 400 and/or the bracket 500 with bolts (e.g., the bolt 412). Alternatively, the link arm 424 may be welded, riveted, or be a part of the mounting bracket 400 and/or the bracket 500 as well. Although the link arm 424 is attached to the mounting bracket 400 at the bolt 412 and the bolt 410, the link arm 424 may be attached to the mounting bracket 400 at other points, e.g., at the bolt 414 and/or the bolt 408.

Figure 13:
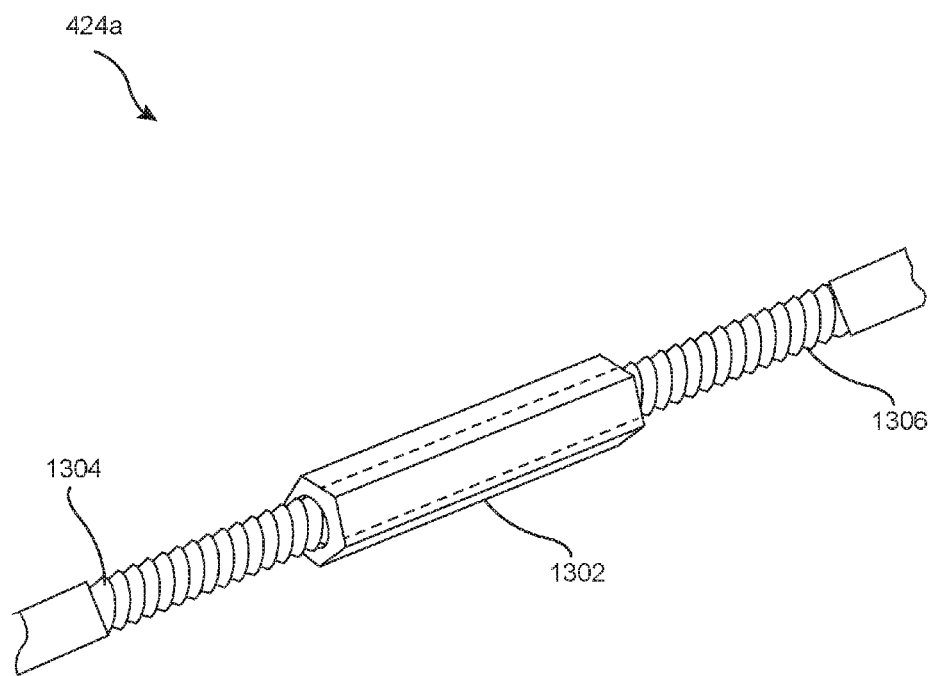
FIG. 13 illustrates an adjustable length of a link arm of the mounting bracket of FIGS. 4A and 4B and FIGS. 5A and 5B, according to an exemplary aspect of this disclosure.

Further, the link arm 424 may be removable to accommodate another link arm of different dimensions, for example, a longer link arm for a differently dimensioned mounting bracket 400 or the mounting bracket 500. FIG. 13 illustrates a mechanism for an adjustable length of the link arm 424 illustrated using the first member 424a (although the second member 424b could be additionally or optionally have an adjustable length, similar to the first member 424a). As illustrated in FIG. 13, an adjustable nut 1302 may accept a first threaded portion 1304 and a second threaded portion 1306 of the first member 424a at respective ends of the first member 424a. The first threaded portion 1304 and/or the second threaded portion 1306 may move inside the adjustable nut 1302 to vary an overall length of the link arm 424. For example, the adjustable nut 1302 may be rotatable about a major axis of the first member 424a to increase or decrease a length of the link arm 424. Upon rotation of the adjustable nut 1302, the first threaded portion 1304 and/or the second threaded portion 1306 may move in or out of the adjustable nut 1302 depending upon a direction of rotation of the adjustable nut 1302. Alternatively or additionally, the first threaded portion 1304 and/or the second threaded portion 1306 may be rotated into or out of the adjustable nut 1302 to adjust a length of the first member 424b. Such flexibility in the attachment of the mounting bracket 400 to the link arm 424 may be utilized to vary an orientation of the mounting bracket 400 within the tester 200 to accommodate a specific size and shape of the water cooled type alternator 100, or to accommodate a different sized and shaped water cooled type alternator, as well as different mounting hole patterns.

The mounting bracket 400 may include a plurality of bolts 408, 410, 412, and 414, although a higher or a lower number of bolts greater than one may be used. For example, five bolts instead of the plurality of bolts 408, 410, 412, and 414 may be used. In one aspect, the plurality of bolts 408, 410, 412, and 414 may be equidistant from each other. Alternatively, a positioning of the plurality of bolts 408, 410, 412, and 414 may be at unequal distances relative to each other and/or relative to edges of the body 402 (or, the body 502). The plurality of bolts 408, 410, 412, and 414 may be made of a material (e.g., a metal/an alloy) having strength to support a wide range of weights. Individually, the plurality of bolts 408, 410, 412, and 414 may be interchangeably referred to as a first bolt, a second bolt, a third bolt, and a fourth bolt, respectively, although other orders of referencing could be used.

In one aspect, the plurality of bolts 408, 410, 412, and 414 may be attached to slots (not shown) on the body 402 and/or the body 502. Such slots may add flexibility to a positioning of the plurality of bolts 408, 410, 412, and 414 on the body 402 and the body 502. Alternatively, the plurality of bolts 408, 410, 412, and 414 may be positioned along a single continuous slot running along a length of the body 402 and/or the body 502. Still alternatively, the number of slots may be variable and plurality of bolts 408, 410, 412, and 414 may share one or more slots. For example, a slot on the first portion 404 may be shared by the third bolt 412 and the fourth bolt 414 and another slot on the second portion 406 may be shared by the first bolt 408 and the second bolt 410.

Figure 6:
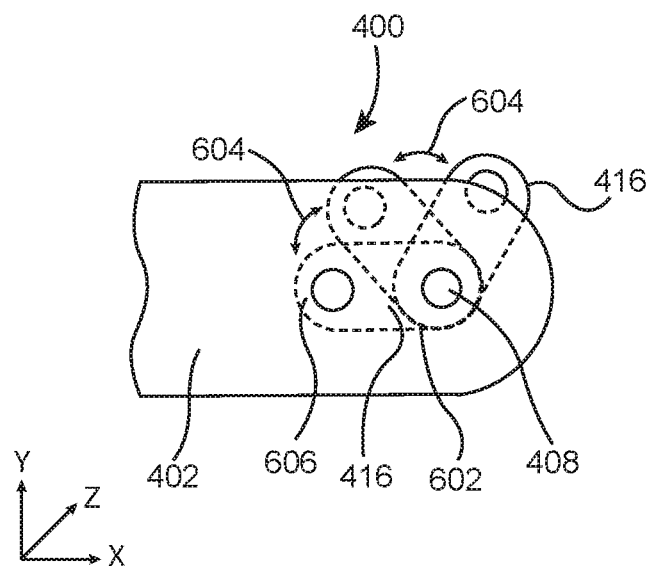
FIG. 6 illustrates a pivot arm and a bolt of the mounting bracket using FIG. 4A or 4B as an example, according to an exemplary aspect of this disclosure.

In one aspect, each of the plurality of bolts 408, 410, 412, and 414 is coupled to a plurality of pivot arms 416, 418, 420, and 422, respectively. Such coupling may be through a ratchet and pawl arrangement (not shown), for example. Alternatively, the coupling may be implemented using a washer and/or a fastener and/or via a welding process. For example, as illustrated in FIG. 6, the pivot arm 416 pivots about the bolt 408 attached to a first end 602 of the pivot arm 416. The pivot arm 416 may pivot about the bolt 408 forming a pivot point in a direction 604 (shown by bi-directional arrows) in the XY plane. For example, a second end 606 of the pivot arm 416 may pivot about the bolt 408. It will be appreciated that the discussion with respect to the bolt 408 and the pivot arm 416 is equally applicable to the bolts 410, 412 and/or 414 and the pivot arms 418, 420, and/or 422, respectively.

Figure 7:
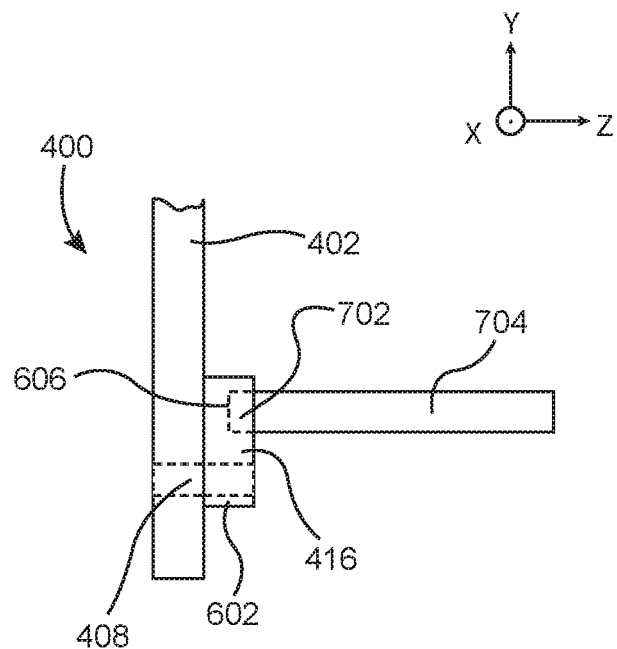
FIG. 7 illustrates a sectional front view of the mounting bracket using FIG. 4A or 4B as an example, according to an exemplary aspect of this disclosure.

Referring to FIG. 7, a view of the mounting bracket 400 (or, the mounting bracket 500, not shown in FIG. 7) viewed perpendicular to the YZ plane is illustrated, in accordance with an aspect of this disclosure. At the second end 606 of the pivot arm 416, the mounting pin 704 is attached at an end 702. The mounting pin 704 is couplable at the end 702 to the second end 606 in the sense that the mounting pin 704 may be removed when the water cooled type alternator 100 is not attached to the tester 200. The mounting pin 704 is similar in construction and structure to the single mounting pin 202. However, the mounting pin 704 pivots with the pivot arm 416 and can therefore be positioned to match any one of the mounting holes 104, 106, 108, 110, 112, and 114 in the mounting hole pattern of the water cooled type alternator 100. In an alternative aspect, the mounting pin 704 may be press fitted or welded at the end 702 to the second end 606 of the pivot arm 416.

Figure 8:
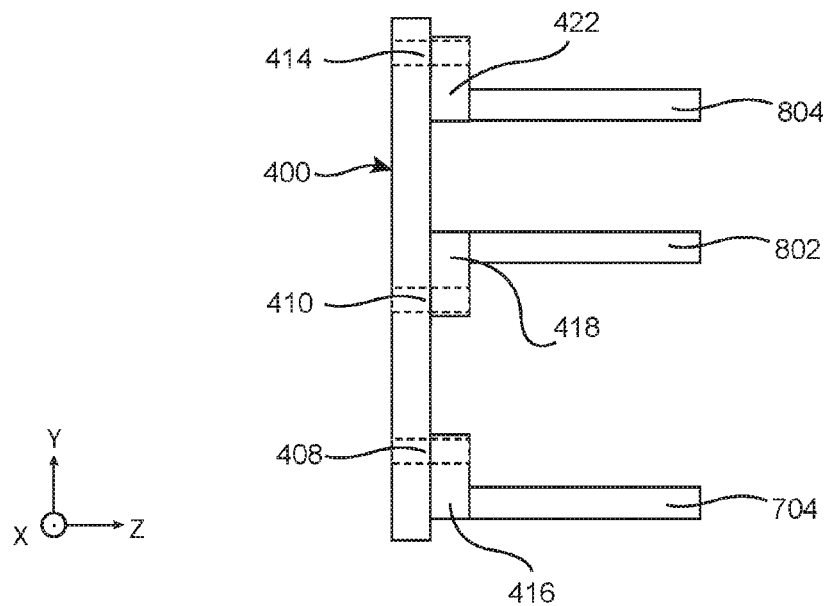
FIG. 8 illustrates the front view of the mounting bracket with a plurality of mounting pins, according to an exemplary aspect of this disclosure.

As illustrated in FIG. 8, when viewed along a direction perpendicular to the YZ plane, the mounting bracket 400 includes a plurality of mounting pins 704, 802 and 804 attached to the pivot arms 416, 418 and 422, respectively. It will be appreciated that a number of mounting pins in the plurality of mounting pins 704, 802, and 804 may be variable and is greater than or equal to two. The plurality of mounting pins 704, 802, and 804 may interchangeably be referred to as a first mounting pin, a second mounting pin, and a third mounting pin, respectively, although other orders of referencing each of the plurality of mounting pins 704, 802, and 804 could be used. Similar to the mounting pin 704, the mounting pins 802 and 804 may pivot around the bolts 410 and 414. As discussed, such flexibility in positioning each of the mounting pins 704, 802, and 804 may accommodate different mounting hole patterns for different water cooled type alternators. Further, in contrast to the single mounting pin 202, the weight of the water cooled type alternator 100 is distributed on the mounting pins 704, 802, and 804 leading to a less likelihood that the mounting pins 704, 802, and 804 may bend or may break, that a casing of the alternator 100 may break, or that one or more of the mounting holes 104, 106, 108, 110, 112, and 114 may disfigure or break. Such a likelihood of a potential damage (e.g., to the mounting pins 704, 802, and 804) may be further reduced by using additional mounting pins on additional mounting holes. By way of example only and not by way of limitation, the mounting pins 704, 802, and 804 may be each 7-8 mm or less in length.

Figure 9:
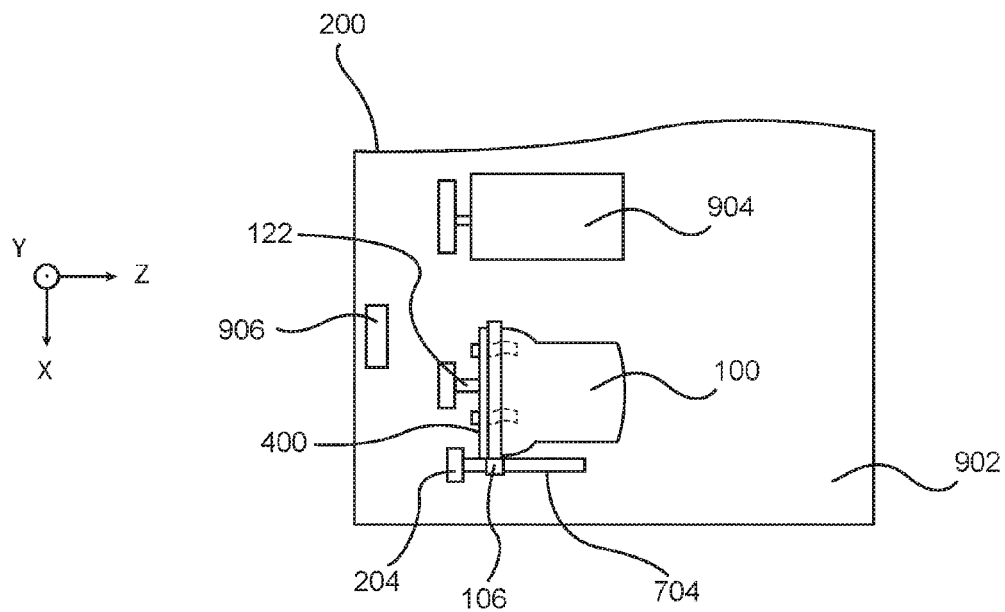
FIG. 9 illustrates a top view of the tester with the water cooled type alternator mounted on the tester using the mounting bracket using FIG. 4A or 4B as an example, according to an exemplary aspect of this disclosure.

Referring to FIG. 9, the tester 200 is illustrated with the water cooled type alternator 100 mounted on the mounting bracket 400, in accordance with an aspect of this disclosure. The view shown in FIG. 9 is from a top of the tester 200 viewed in a direction perpendicular to the XZ plane. The water cooled type alternator 100 is mounted on the mounting pins 704, 802, and 804 (with only the mounting pin 704 visible in FIG. 9). Further FIG. 9 illustrates a drive motor 904 arranged on the chassis 902 of the tester 200 and a belt tensioner base 906 upon which a belt tensioner (not shown) rests. The belt tensioner couples a drive belt (not shown) to the input shaft 122 of the water cooled type alternator 100 after mounting the water cooled type alternator 100. Since the belt tensioner and the drive belt are known to one of ordinary skill in the art, they are not being described in detail herein.

In one aspect, FIG. 9 illustrates components of a system for mounting the water cooled type alternator 100. Such a system may include the tester 200, the mounting bracket 400 or the mounting bracket 500, one or more of the plurality of mounting pins 704, 802, and 804 couplable to the mounting bracket 400 via the plurality of bolts 408, 410, 412, respectively (the mounting pins 802 and 804 are not explicitly shown in FIG. 9). Such a system may further include the water cooled type alternator 100 and may be used for testing the water cooled type alternator 100 mounted to the mounting bracket 400 and/or the mounting bracket 500.

Figure 10:
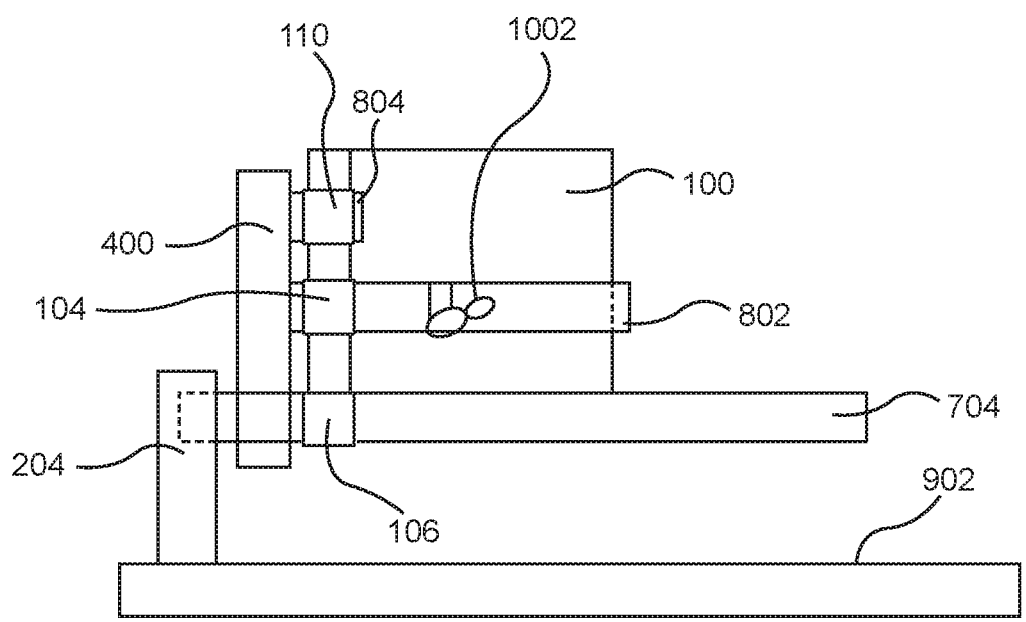
FIG. 10 illustrates a clamp used to hold the water cooled type alternator, according to an exemplary aspect of this disclosure.
Figure 11:
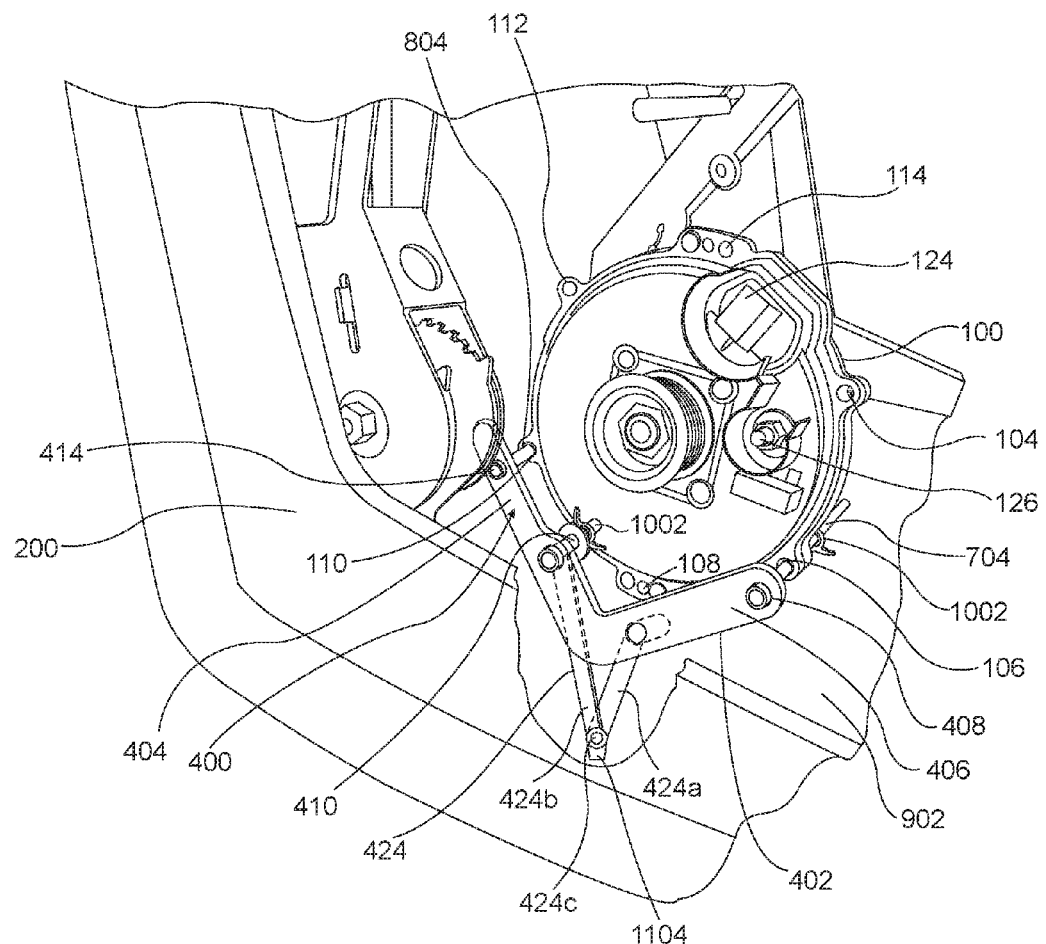
FIG. 11 illustrates a side view of the water cooled type alternator mounted on the tester using the mounting bracket of FIGS. 4A and 4B, according to an exemplary aspect of this disclosure.

Referring to FIG. 10, a side view of the water cooled type alternator 100 along the YZ plane is illustrated, in accordance with an aspect of this disclosure. FIG. 10 illustrates a clamp 1002 inserted, for example, on the mounting pin 802 after the water cooled type alternator 100 has been mounted on the mounting bracket 400. It will be appreciated that the clamp 1002 may instead be inserted on the mounting pin 704 (e.g., as shown in FIG. 11) or the mounting pin 804. Alternatively, additional clamps similar to the clamp 1002 may be used for each of the mounting pins 704, 802, and 804. The clamp 1002 forms a locking device to hold the water cooled type alternator 100 in a stable position. In one aspect, once the clamp 1002 has been put in place, a sleeve (not shown) may slide on the mounting pin 802. Such a sleeve may protect the surfaces of the water cooled type alternator 100 from damaging the sealing surface thereof or the "O" ring of the water cooled type alternator 100. In one aspect, instead of the clamp 1002, a latch may be utilized as a locking device to hold the water cooled type alternator 100 securely to the mounting bracket 400.

Further, FIGS. 9 and 10 illustrate the water cooled type alternator 100 to be mounted using the mounting pin 704 with the fixed base 204, in addition to the mounting bracket 400. However, such an arrangement using the fixed base 204 and the mounting bracket 400 is for retrofitting the tester 200 to accommodate the mounting bracket 400, when the tester 200 as originally manufactured is configured to mount the water cooled type alternator 100 using only the single mounting pin 202 (not shown in FIG. 10). In one aspect of this disclosure, the fixed base 204 may be optional.

Referring to FIG. 11, another view of the water cooled type alternator 100 on the tester 200 is illustrated, in accordance with an aspect of this disclosure. In FIG. 11, the mounting bracket 400 of FIGS. 4A and 4B is illustrated with the water cooled type alternator 100 supported by the mounting pins 704 and 804 going through the mounting holes 106 and 110, respectively. The clamp 1002 may be used to lock the mounting pin 704 as well as the link arm 424 in FIG. 11. The mounting bracket 400 may be coupled by the link arm 424 to the base 1104 of the tester 200, the base 1104 being further attached to the chassis 902 of the tester 200. The water cooled type alternator 100 once mounted securely onto the mounting bracket 400 is ready for testing by the tester 200. Such tests may include diagnostic tests, stress tests, or other types of tests specific to the water cooled type alternator 100, as will be appreciated by one of ordinary skill in the art in view of this disclosure.

Figure 12:
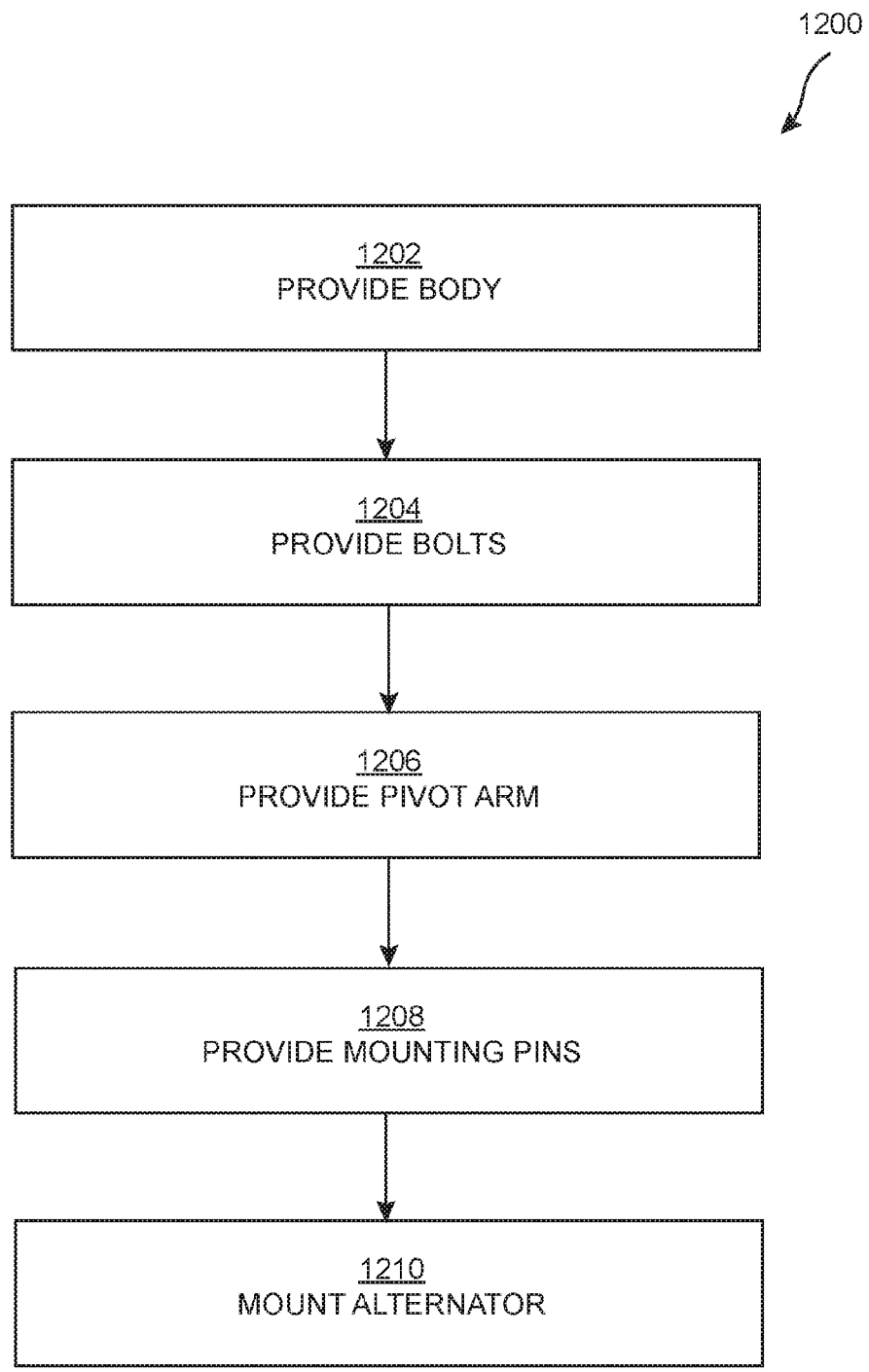
FIG. 12 illustrates a flowchart for a method of providing the mounting brackets of FIGS. 4A and 4B and FIGS. 5A and 5B, according to an exemplary aspect of this disclosure.

Referring to FIG. 12, a method 1200 for providing the mounting bracket 400 for the water cooled type alternator 100 is illustrated as a flowchart, in accordance with an aspect of this disclosure. FIG. 12 presents the method 1200 as a flow diagram, although the method 1200 may be understood using other types of presentations such as process diagrams, graphs, charts, timing diagrams, etc. In one aspect, one or more processes or operations in the method 1200 may be carried out by a manufacturer of the tester 200 and/or the mounting bracket 400, for example, using robotic devices and computer numerical controlled (CNC) machines. The method 1200 may at least partially be implemented by executing the computer executable instructions stored in an internal memory (not shown) of the tester 200.

The method 1200 may begin in an operation 1202 where the body 402 or the body 502 of the mounting bracket 400 is provided. The body 402 may be provided from a single cast molded metal piece. Alternatively, the body 402 may be provided by precision welding the first portion 404 substantially perpendicular to the second portion 406. Likewise, the body 502 may be provided using a cast mold that is arcuate in shape. Alternatively, one or more slots may be provided on the body 402 or the body 502, as discussed with respect to FIGS. 4A, 4B and 5A, 5B.

In an operation 1204, the plurality of bolts 408, 410, 412, and 414 may be provided. The plurality of bolts 408, 410, 412, and 414 may be provided by welding metallic pieces to the body 402 or the body 502. Alternatively, the plurality of bolts 408, 410, 412, and 414 may be part of a single cast molded die having perpendicular projections off the body 402 or the body 502 that form the plurality of bolts 408, 410, 412, and 414. Still alternatively, the plurality of bolts 408, 410, 412, and 414 may be attached to one or more slots provided on the body 402 or the body 502 in the operation 1202.

In an operation 1206, the pivot arms 416, 418, 420, and 422 may be provided coupled to the plurality of bolts 408, 410, 412, and 414. The pivot arms 416, 418, 420, and 422 may rotate about the plurality of bolts 408, 410, 412, and 414. Additional washers or clamps may be provided to hold the pivot arms 416, 418, 420, and 422 to the plurality of bolts 408, 410, 412, and 414 during operation or pivoting. For example, the pivot arm 416 may attach to the bolt 408 at the first end 602 of the pivot arm 416.

In an operation 1208, the mounting pins 704, 802, and 804 may be provided. For example, the end 702 of the mounting pin 704 may be slid into or press fitted into a recess or a hole at the second end 606 of the pivot arm 416. Likewise, the mounting pins 802 and 804 may be attached to the pivot arms 418 and 422, respectively. The mounting bracket 400 may then be attached to the chassis 902 via the link arm 424 attached to the bolts 410 and 412, for example.

In an operation 1210, the water cooled type alternator 100 may be mounted by sliding the mounting pins 704, 802, and 804 into the mounting holes 106, 108, and 112, respectively. Once mounted, the clamp 1002 may be used to secure the water cooled type alternator 100 to one or more of the mounting pins 704, 802, and 804. Upon mounting, a drive belt may be coupled to the input shaft 122 of the water cooled type alternator 100 for testing using the tester 200.

In yet another aspect, in the method 1200, one or more processes or operations, or sub-processes thereof, may be skipped or combined as a single process or operation, and a flow of processes or operations in the method 1200 may be in any order not limited by the specific order illustrated in FIG. 12. For example, one or more processes or operations may be moved around in terms of their respective orders, or may be carried out in parallel. The term "flow," as used with respect to FIG. 12, generally refers to a logical progression of operations in an exemplary manner carried out for making the mounting bracket 400 and/or subsequently mounting the water cooled type alternator 100 onto the tester 200. However, such a flow is by way of example only and not by way of limitation, as at a time, the flow may proceed along multiple operations or processes of the method 1200. Further, the method 1200 may be carried out for various types of water cooled type alternators and is not limited to a particular type of water cooled type alternator.

The many features and advantages of the present disclosure are apparent from the detailed specification, and thus, it is intended by the appended claims to cover all such features and advantages of the present disclosure, which fall within the true spirit, and scope of the present disclosure. Further, since numerous modifications and variations will readily occur to those skilled in the art, it is not desired to limit the present disclosure to the exact construction and operation illustrated and described, and accordingly, all suitable modifications and equivalents may be resorted to, falling within the scope of the present disclosure.

What is claimed is:

1. A mounting bracket for a water cooled type alternator, the mounting bracket comprising:
    a body;
    a plurality of bolts attached to the body;
    a plurality of pivot arms including a first pivot arm attached to a first bolt in the plurality of bolts at a first end of the first pivot arm; and
    a link arm coupled to the body at a second end of the first pivot arm.
2. The mounting bracket of claim 1, wherein the link arm is further coupled to a chassis of a tester for a water cooled type alternator.
3. The mounting bracket of claim 1, wherein the body is arcuate in shape.
4. The mounting bracket of claim 1, wherein the body includes two substantially perpendicular portions.
5. The mounting bracket of claim 1, wherein the plurality of bolts includes a third bolt and a fourth bolt, the first bolt, the second bolt, the third bolt and the fourth bolt being placed at equal distances along the body of the mounting bracket.
6. The mounting bracket of claim 1, further comprising:
    a mounting pin couplable to a second end of the first pivot arm.
7. The mounting bracket of claim 6, wherein the mounting pin is positioned on the first pivot arm in a direction perpendicular to the body of the mounting bracket.
8. The mounting bracket of claim 6, wherein the mounting pin is coupled to a locking device configured to hold a water cooled type alternator on the mounting pin.
9. The mounting bracket of claim 1, further comprising:
    a plurality of mounting pins arranged relative to the body to match a mounting hole pattern of a water cooled type alternator attachable to the mounting bracket.
10. A tester comprising the mounting bracket of claim 1.
11. A system for mounting a water cooled type alternator, comprising:
    a tester including a chassis; and
    a mounting bracket attached to the chassis via a link arm, the mounting bracket including:
        a body, a plurality of bolts attached to the body of the mounting bracket, a pivot arm, at least one bolt in the plurality of bolts attached to a first end of the pivot arm, and a mounting pin coupled to a second end of the pivot arm.
12. The system of claim 11, wherein the pivot arm in pivotable about the at least one bolt to adjust a position of the mounting pin based upon a mounting hole pattern of a water cooled type alternator.
13. The system of claim 11, wherein the body is arcuate in shape.
14. The system of claim 11, wherein the body includes two substantially perpendicular portions.
15. The system of claim 11, wherein the plurality of bolts includes at least four bolts placed at equal distances along the body of the mounting bracket.
16. The system of claim 11, wherein the mounting pin is positioned on the pivot arm in a direction substantially perpendicular to the body of the mounting bracket.
17. The system of claim 11, further comprising:
    a water cooled type alternator attached to the mounting pin.
18. The system of claim 17, wherein the mounting pin is coupled to a locking device configured to hold the water cooled type alternator.
19. The system of claim 17, wherein the mounting pin for each bolt in the plurality of bolts is arranged relative to the body to match a mounting hole pattern of the water cooled type alternator.
20. A method for providing a mounting bracket for a water cooled type alternator, the method comprising:
    providing a body of a mounting bracket;
    providing a plurality of bolts attached to the body, a first bolt in the plurality of bolts attached to a first pivot arm at a first end of the first pivot arm and a second bolt in the plurality of bolts attached to a second pivot arm at a first end of the second pivot arm; and
    providing at least two mounting pins, a first mounting pin coupled to a second end of the first pivot arm and a second mounting pin coupled to a second end of the second pivot arm coupled to the second bolt for mounting a water cooled type alternator, the first mounting pin and the second mounting pin being movable to respective positions to match a mounting hole pattern of the water cooled type alternator.

* * * * *